United States Patent
Waldenberger et al.

(10) Patent No.: US 11,981,513 B2
(45) Date of Patent: May 14, 2024

(54) RETURN ROLLER ASSEMBLIES FOR CONVEYOR

(71) Applicant: Dorner Mfg. Corp., Hartland, WI (US)

(72) Inventors: David Waldenberger, Sussex, WI (US); Craig Bude, Waukesha, WI (US)

(73) Assignee: Dorner Mfg. Corp., Hartland, WI (US)

( * ) Notice: Subject to any disclaimer, the term of this patent is extended or adjusted under 35 U.S.C. 154(b) by 0 days.

(21) Appl. No.: 17/957,397

(22) Filed: Sep. 30, 2022

(65) Prior Publication Data

US 2024/0109729 A1  Apr. 4, 2024

(51) Int. Cl.
*B65G 23/10*  (2006.01)
*B65G 39/04*  (2006.01)

(52) U.S. Cl.
CPC ............. *B65G 23/10* (2013.01); *B65G 39/04* (2013.01); *B65G 2207/26* (2013.01)

(58) Field of Classification Search
CPC ..... B65G 39/04; B65G 2207/26; B65G 23/10
See application file for complete search history.

(56) References Cited

U.S. PATENT DOCUMENTS

| | | | | |
|---|---|---|---|---|
| 2,052,900 A * | 9/1936 | Searles | ................. | B65G 39/04 198/493 |
| 2,876,890 A * | 3/1959 | Baechli | ................. | B65G 39/04 198/824 |
| 2,942,721 A * | 6/1960 | Kidd | ..................... | B65G 39/04 198/825 |
| 3,550,758 A * | 12/1970 | Stalker | ................... | B65G 39/04 193/37 |
| 4,720,007 A * | 1/1988 | Milek | .................... | B65G 39/04 198/830 |
| 4,730,723 A * | 3/1988 | Mossot | ................. | B65G 39/04 198/828 |
| 5,169,623 A * | 12/1992 | Kopolow | ............... | A61K 8/891 424/47 |
| 7,207,435 B2 | 4/2007 | Bude et al. | | |
| 8,042,682 B2 | 10/2011 | Ertel | | |
| 9,221,609 B2 * | 12/2015 | Specht | ................... | B65G 39/02 |
| 9,415,944 B2 * | 8/2016 | Sozio | ..................... | B65G 39/04 |
| 9,440,796 B2 * | 9/2016 | Axmann | ................ | B65G 39/16 |
| 11,279,565 B2 * | 3/2022 | Ellerhorst | ............. | B65G 23/04 |
| 2011/0176858 A1 * | 7/2011 | Lally | ..................... | B65G 39/04 24/457 |
| 2021/0253360 A1 * | 8/2021 | Rogers | .................. | B65G 39/07 |

* cited by examiner

*Primary Examiner* — Mark A Deuble (57) ABSTRACT

A return roller assembly that is designed for use as part of a conveyor assembly to improve the ability to clean the conveyor assembly. The return roller assembly includes a roller shaft that extends between side walls of a conveyor frame. A plurality of support rollers are positioned along the length of the roller shaft to support a lower run of a continuous conveyor belt. A spacer is positioned between each of the support rollers to define the position of the rollers along the roller shaft. The spacer can be snapped onto the roller shaft and includes a series of standoffs that space the inner surface of the spacer from the roller shaft. A series of cleaning fins extend radially from the outer surface of the spacer and impart rotation to the spacer relative to the roller shaft during cleaning with a spray of water. The spacer can be formed from an extrusion cut to length.

18 Claims, 5 Drawing Sheets

RETURN ROLLER ASSEMBLIES FOR CONVEYOR

BACKGROUND

The present disclosure generally relates to return roller assemblies that are part of a conveyor having a conveyor belt. More specifically, the present disclosure relates to one or more extruded spacers that are used to space return rollers along a return roller shaft and can be installed and removed quickly and cleaned in place.

Presently, in food processing conveyor applications, conveyors must be manufactured such that the conveyor belt can be removed and the entire conveyor frame assembly sanitized. Following sanitation, the conveyor belt must be reinstalled for continued operation. Numerous guidelines exist to regulate the type of conveyor assembly that be used in a sanitary environment, such as in a food processing facility. Typically, these guidelines require that the conveyor frame assembly must be capable of being disassembled and sanitized on a regular, scheduled basis. Since the conveyor frame assembly must be sanitized regularly, the conveyor assembly must be capable of being quickly disassembled to allow complete cleaning. Preferably, the disassembly should require minimal tool to no tools.

The present inventors have recognized drawback and limitations with current conveyor assemblies that included return roller assemblies and have developed the system of the present disclosure.

SUMMARY

The present disclosure relates to a return roller assembly for use with a conveyor assembly. More specifically, the present disclosure relates to a return roller assembly that supports the lower run of a continuous conveyor belt and includes a series of spacers that can be easily removed and installed and cleaned in place when desired.

The return roller assembly designed for use in supporting a lower run of a continuous conveyor belt includes a roller shaft that extends across and is supported by side walls of a conveyor frame. the roller shaft is stationary and has a circular cross section defined by an outer surface. The roller shaft provides support for a plurality of rollers that are each movable along the longitudinal length of the roller shaft. The rollers each include an outer surface that contact the lower run of the conveyor belt to support the conveyor belt during operation.

The spacing between the rollers is dictated and defined by a plurality of spacers that are attached to the roller shaft between the plurality of rollers. The spacers are each formed from a section of an extruded plastic material that is cut to the desired length. The spacers each have a generally circular outer wall that extends between first and second ends. When the spacer is installed on the roller shaft, the first and second ends of each spacer contact either one of the rollers or one of the side walls to control the spacing of the rollers along the roller shaft.

Each of the spacers includes a access opening that is a missing portion of the outer wall. The access opening is defined by first and second edges. The width of the access opening is less than the outer diameter of the roller shaft. When the spacer is installed on the roller shaft, the outer wall of the spacer flexes to expand the width of the access opening, which allows the spacer to snap into place on the roller shaft. Once installed, the outer wall flexes to hold the spacer on the roller shaft.

The spacers each include a plurality of standoffs that extend radially inward from an inner surface on the outer wall of the spacer. The standoffs contact an outer surface of the roller shaft to create an air gap between the roller shaft and in outer wall of the spacer. The air gap allows water to pass between the spacer and the roller shaft during cleaning with water or another cleaning fluid.

The spacers further include a plurality of cleaning fins that extend radially outward from an outer surface of the outer wall of the spacer. The cleaning fins are spaced along the circular outer wall. During cleaning with a spray of water, the spray of water contacts the cleaning fins and causes the entire spacer to rotate around the roller shaft. Since the spacer includes the series of standoffs, the rotation created by the contact between the spray of water and the cleaning fins causes the standoffs to pass over the outer surface of the roller shaft to scrape material off of the roller shaft.

The present disclosure further relates to a conveyor assembly that includes a conveyor frame and a continuous conveyor belt that is movable along the length of the conveyor frame. The conveyor assembly includes a plurality of roller assemblies as described to support the lower run of a continuous conveyor belt.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
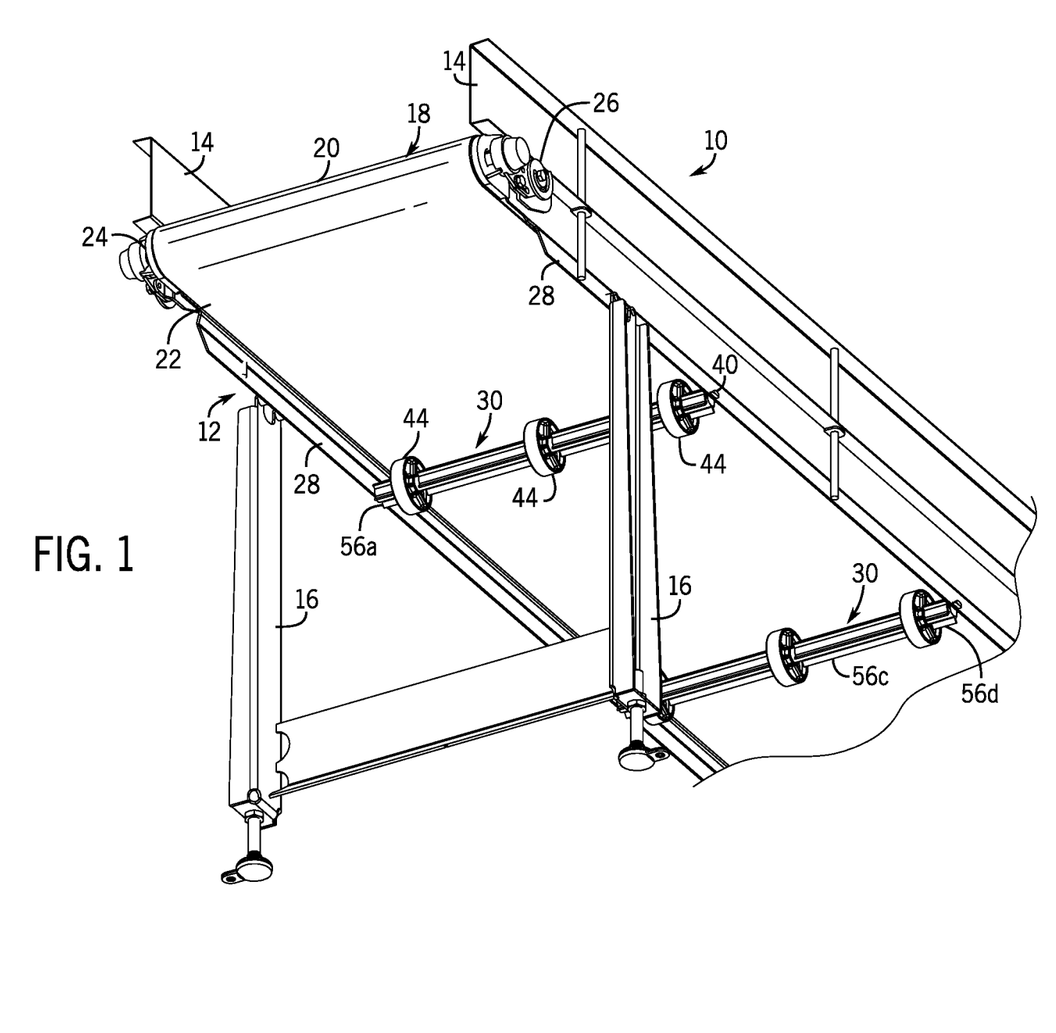
FIG. 1 is a bottom perspective view of a conveyor assembly including the return roller assemblies of the present disclosure.

FIG. 1 illustrates a conveyor assembly 10 constructed in accordance with the present disclosure. The conveyor assembly 10 generally includes a conveyor frame 12 that includes a pair of side walls 14 that define the width of the conveyor assembly 10. The side walls 14 are each connected to a series of legs 16 that are spaced along the length of the conveyor frame 12 and support the entire conveyor assembly 10 above a support surface, such as a floor. The conveyor assembly 10 includes a continuous conveyor belt 18 that extends along the entire length of the conveyor assembly 10. The continuous conveyor belt 18 defines an upper run 20 and a lower run 22. The upper run 20 of the conveyor belt 18 supports objects as they move along the length of the conveyor assembly 10 while the lower run 22 returns the conveyor belt to the infeed end. The conveyor belt 18 moves along the length of the conveyor assembly and transitions between the upper and lower runs around a pair of end rollers 24. One of the end rollers, shown in FIG. 1, is an idler/tension roller while the opposite end roller (not shown) is driven by an electric drive motor to impart the required movement to the conveyor belt 18. In the embodiment shown in FIG. 1, the end roller 24 includes a tension adjustment assembly 26 that allows an operator to introduce the required tension into the conveyor belt 18 to compensate for stretching of the conveyor belt 18 over the life span of the conveyor belt 18.

As shown in FIG. 1, each of the side walls 14 includes a lower flange 28 that is used to support a plurality of return roller assemblies 30 along the length of the conveyor frame 12. The return roller assemblies 30 each provide support for the lower run 22 of the conveyor belt 18 as the lower run 22 moves between the pair of spaced end rollers 24. In the embodiment shown in FIG. 2, a pair of return roller assemblies 30 are shown over the partial length of the conveyor belt 18. It is contemplated that the number of return roller assemblies 30 would depend upon the overall length of the entire conveyor assembly 10. The spacing between the return roller assemblies 30 is selected to prevent excess sagging of the lower run 22 of the conveyor belt and can vary depending on the type of conveyor belt, the operating speed of the conveyor belt and the width of the conveyor assembly.

Figure 2:
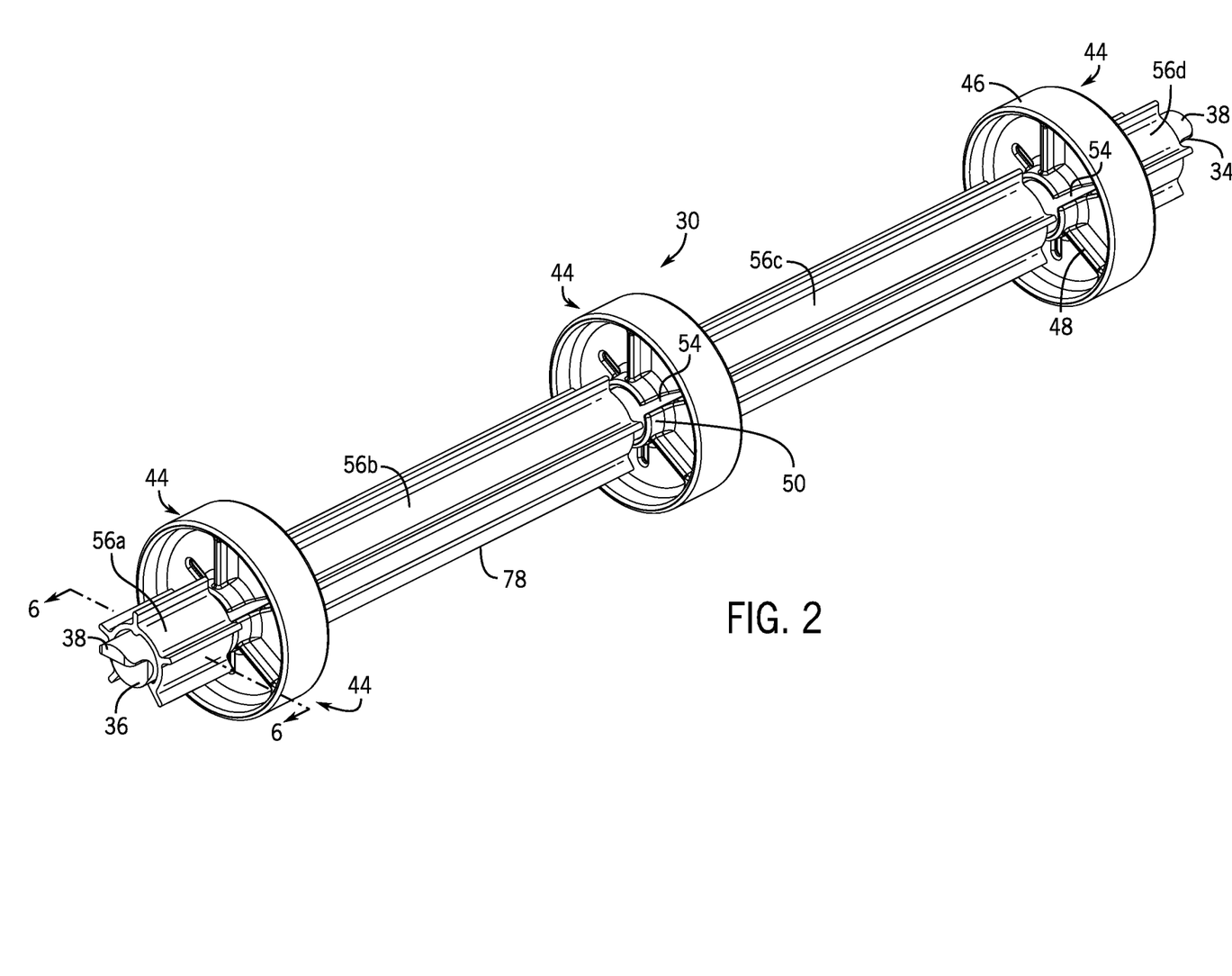
FIG. 2 is a perspective view of one of the return roller assemblies of the present disclosure.
Figure 3:
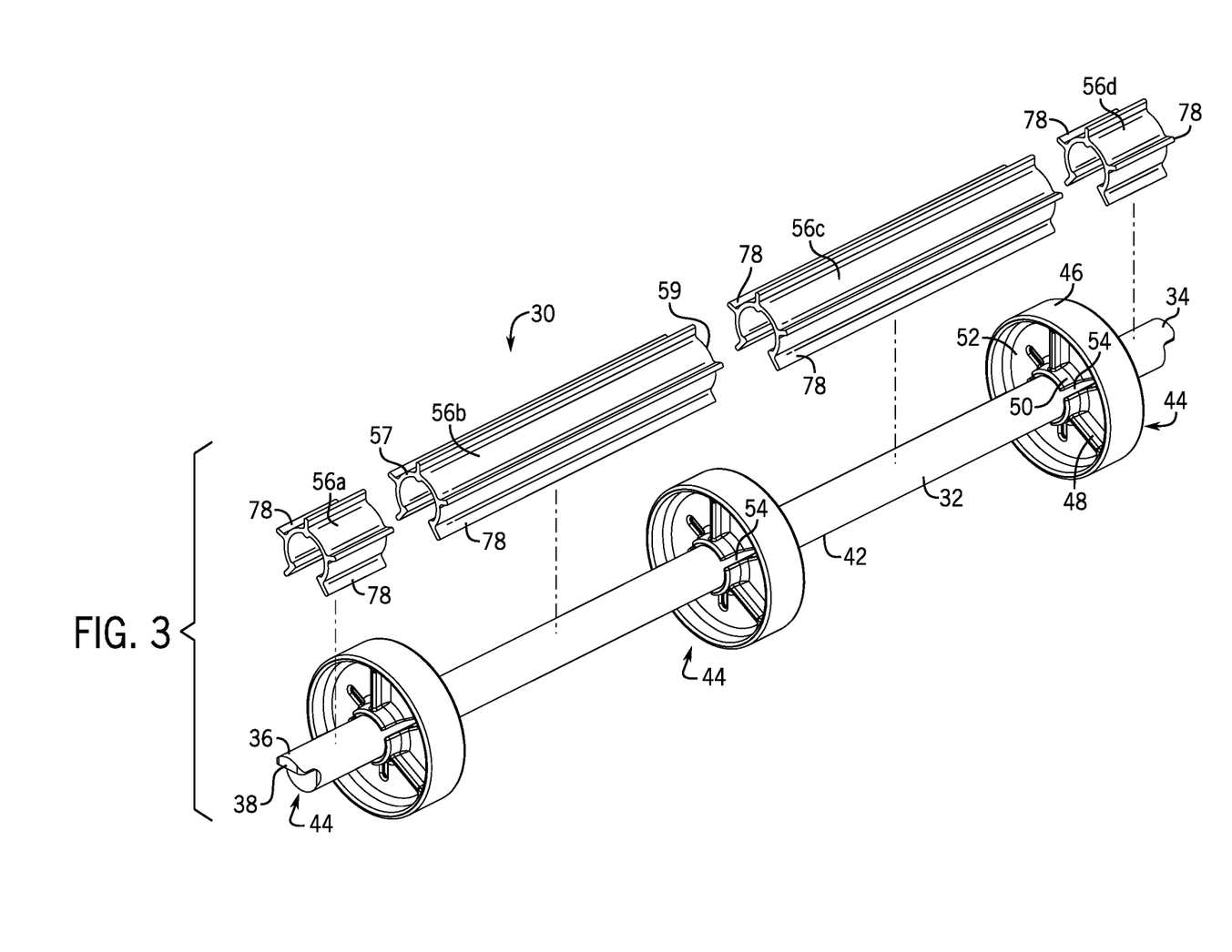
FIG. 3 is an exploded perspective view of one of the return roller assemblies of the present disclosure.

FIGS. 2 and 3 illustrate the components of each of the return roller assemblies 30 constructed in accordance with the present disclosure. FIG. 2 shows the return roller assembly 30 in an assembled condition while FIG. 3 is an exploded view showing the return roller assembly 30 in a disassembled condition.

As shown in FIG. 3, the return roller assembly includes a roller shaft 32 that extends between a first end 34 and a second end 36. Each of the first and second ends 34, 36 includes a support tab 38 that extends from the respective end. The support tab 38 is designed to be received within a corresponding slot 40 formed in the lower flange 28 of the side wall 14, as best shown in FIG. 1. The interaction between the slot 40 and the support tab 38 prevents rotation of the roller shaft 32 when the roller shaft 32 is supported across the width of the conveyor frame between the side walls 14. The roller shaft 32 has a circular cross section defined by an outer surface 42 that defines the diameter of the roller shaft 32. In the embodiment illustrated, the roller shaft 32 is formed from a metallic material that is both durable and can be cleaned and sanitized, such as stainless steel. However, other materials could be used in place of stainless steel while operating within the scope of the present disclosure.

In the embodiment shown in FIGS. 2 and 3, the return roller assembly 30 includes a plurality of support rollers 44 that are spaced along the length of the roller shaft 32 between the first end 34 and the second end 36. Each of the rollers 44 includes a circular outer support surface 46. The outer support surface 46 is designed to contact the lower run 22 of the conveyor belt 18, as shown in FIG. 1. The outer support surface 46 is reinforced and radially supported by a series of support spokes 48 that extend from a center hub 50 out to the support surface 46. Each of the rollers 44 further includes a center wall 52 that extends from the hub 50 out to the support surface 46. In the embodiment illustrated, each of the rollers 44 is formed from a molded plastic or nylon material that can be readily cleaned and is lightweight and sufficiently strong to support the weight of the lower run 22 of the conveyor belt as illustrated in FIG. 1.

As can be seen in FIGS. 2 and 3, the center hub 50 includes an open gap 54 that allows water to access the area of the roller shaft 32 directly below the roller diameter. The open gap 54 in the center hub 50 of each of the rollers 44 further aids the cleaning of the roller assembly 30 while the spacers 56 remain in place and provide the desired spacing between the rollers 44. During operation, each of the rollers 44 are rotatable about the stationary roller shaft 32 as the lower run 22 of the conveyor belt 18 moves over the support rollers 44.

In the embodiment of the disclosure shown in FIGS. 2 and 3, a plurality of individual spacers 56 are used to provide the required and desired spacing between the individual rollers 44 along the length of the roller shaft 32. A pair of end spacers 56A and 56D provide the required spacing between the outer most rollers 44 and the adjacent side wall 14. The pair of center spacers 56B and 56C provide the required spacing between the individual rollers 44 as illustrated. In this manner, the length of each of the individual spacers 56 controls the position of the rollers 44 along the length of the roller shaft 32 and thus the spacing between the support rollers 44 along the length of the roller shaft 32. In the embodiment shown best in FIG. 3, each of the spacers 56A-56D each have the same configuration and are each formed from the same extrusion of a plastic or nylon material. The individual spacers 56 are cut to the desired length to dictate the spacing between the side walls and the outermost rollers 44 as well as the spacing between the individual rollers 44 along the length of the roller shaft 32.

Figure 4:
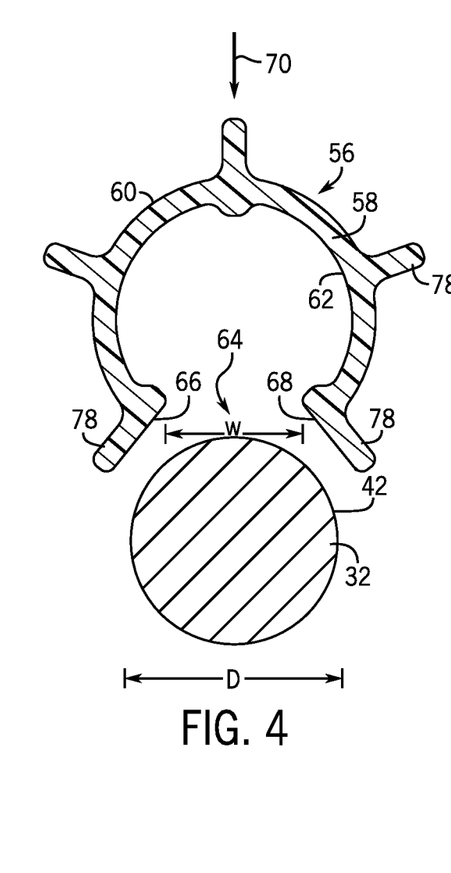
FIG. 4 is an section view of one of the return roller assemblies in the disassembled condition.

Referring now to FIGS. 3 and 4, each of the spacers 56 is defined by a generally cylindrical outer wall 58 that extends between a first end 57 and a second end 59 to define the longitudinal length of the spacer 56. The outer wall 58 of each spacer 56 includes an outer surface 60 and an inner surface 62 that are spaced from each other to define the thickness of the outer wall 58. The outer wall 58 has a generally circular cross section with a removed portion that defines an access opening 64. The access opening 64 that is a missing portion of the otherwise circular outer wall 58 and is defined by a first edge 66 and a second edge 68. The access opening 64 allows the spacer 56 to be installed onto the circular outer surface 42 of the roller shaft 32 when moving the spacer 56 in a direction shown by arrow 70 in FIG. 4. In the embodiment illustrated, the diameter D of the roller shaft 32 is larger than the width W of the access opening 64. When the spacer 56 is moved downward in the direction shown by arrow 70, the first edge 66 and the second edge 68 contact the outer surface 42 and flex outward as shown by arrows 72 in FIG. 5 until the width W of the access opening 64 expands to be equal to the diameter D of the roller shaft 32. The thickness of the outer wall 58 and the material used to create the extrusion are both factors in providing enough flexure in the spacer 56 to allow for the installation as shown.

Figure 6:
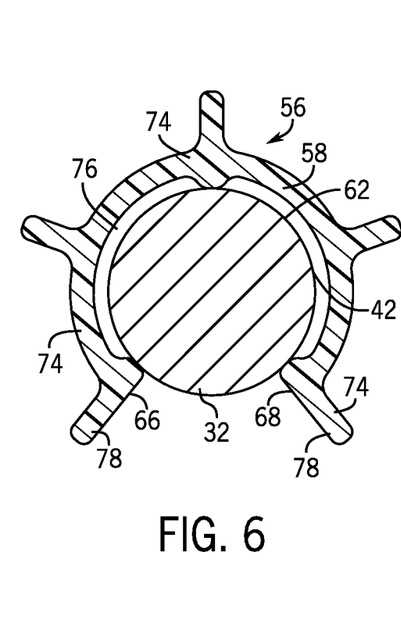
FIG. 6 is a section view as taken along line 6-6 of FIG. 2 showing one of the spacers installed onto the roller shaft.

Once the first and second edges 66, 68 of the spacer 56 pass over the equator of the roller shaft 32, the flexible material that forms the outer wall 58 causes the spacer 56 to flex back to its resting position to move the first edge 66 and the second edge 68 toward each other to securely hold the spacer 56 on the roller shaft 32 as is shown in FIG. 6.

Figure 5:
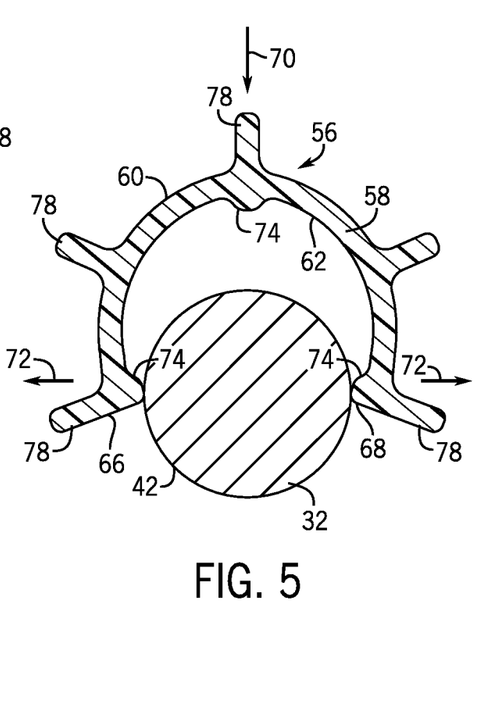
FIG. 5 is a section view showing the installation of one of the spacers onto the roller shaft.

As illustrated in FIGS. 4-6, the inner surface 62 of the outer wall 58 that defines the spacer 56 includes a series of standoffs 74 that each protrude radially inward from the inner surface 62. The standoffs 74 in the embodiment illustrated extend along the entire length of the spacer 56.

However, it is contemplated that the standoffs 74 could be interrupted along the length of the spacer 56 to create sections of standoffs 74. In the embodiment illustrated, the entire spacer 56 is an extruded plastic component and each of the standoffs 74 extends along the length of the standoff.

Referring now to FIG. 6, when the spacer 56 is installed onto the roller shaft 32, each of the standoffs 74 contacts the outer surface 42 of the roller shaft 32 to create an air gap 76. The air gap 76 is the area that is located between the outer surface 42 of the roller shaft 32 and the inner surface 62 of the outer wall 58 of the spacer 56. The air gap 76 extends along the entire length of the spacer 56 from the first end 57 to the second end 59. The size of the air gap 76 is dictated by the distance the standoff 74 protrudes radially inward from the inner surface 62.

As can be seen in FIGS. 4-6, a standoff 74 is formed along both the first edge 66 and the second edge 68 such that each of the first and second edges is spaced away from the outer surface 42 of the roller shaft 32.

As illustrated in FIGS. 2-6, each of the spacers 56 is formed with a plurality of cleaning fins 78 that each extend radially from the outer surface 60 of the outer wall 58. In the embodiment shown, the spacer 56 includes five cleaning fins 78 that are spaced around the outer periphery of the generally cylindrical outer wall 58. However, fewer or more cleaning fins 78 could be included on the spacer 56. As illustrated in FIGS. 4-6, one of the cleaning fins 78 is formed at each of the first edge 66 and the second edge 68 that define the access opening 64. The location of cleaning fins 78 at the first and second edges 66, 68 allow for easier removal of the spacers 56 when needed. Specifically, when the spacer 56 needs to be removed, a user can apply outward pressure to each of the cleaning fins 78 at the first and second edges to expand the width of the access opening while also applying upward pressure. Such forces and movement will allow the spacer 56 to be removed in a sequence opposite to that shown in FIGS. 4-6 described during the installation process of the spacer 56.

Referring back to FIG. 6, when the spacer 56 is installed on the roller shaft 32, the standoffs 74 create three points of contact between the spacer 56 and the roller shaft 32. The air gap 76 created between the spacer 56 and the roller shaft 32 minimizes the points of contact, which creates a more sanitary configuration. In addition, the air gap 76 allows water to flow between the roller shaft 32 and the spacer 56 during cleaning and/or pressure washing of the entire conveyor assembly.

Figure 7:
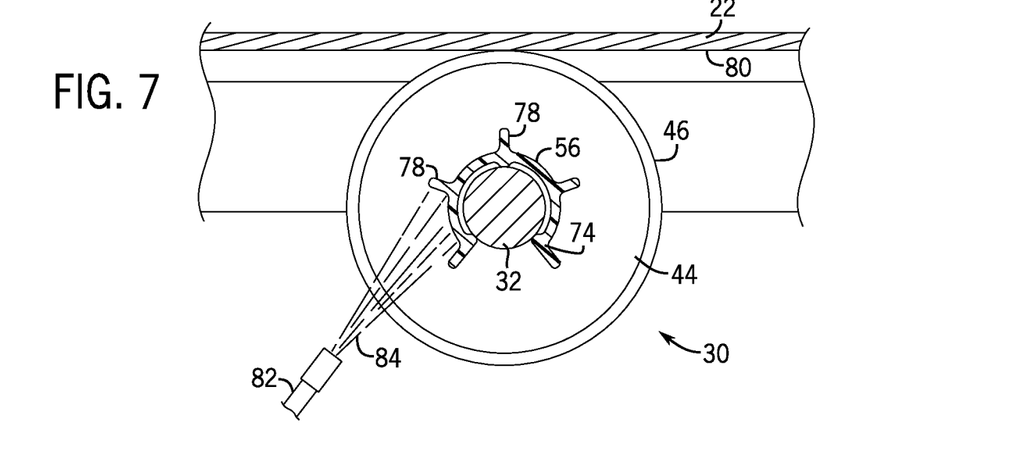
FIG. 7 is a section view showing the cleaning process for the return roller assembly.
Figure 8:
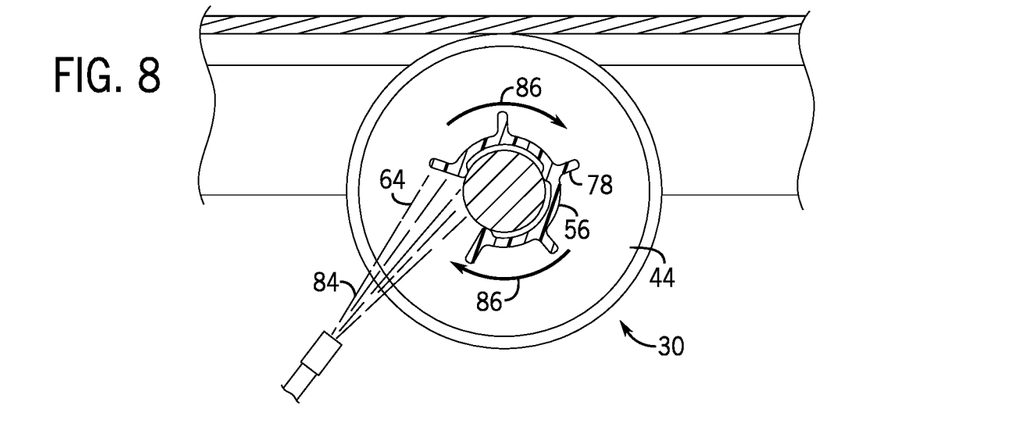
FIG. 8 is a section view similar to FIG. 7 illustrating the rotation of the spacer about the return roller shaft during the cleaning process.
Figure 9:
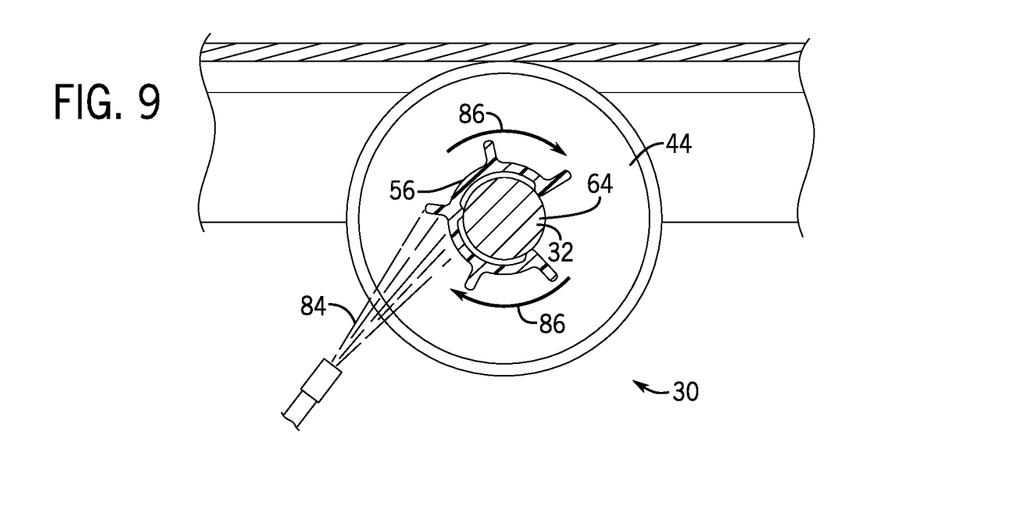
FIG. 9 is a section view showing further rotation of the spacer about the return roller shaft during the cleaning process.

Referring now to FIGS. 7-9, the operation of the return roller assemblies 30 in improving the cleaning of the conveyor assembly will be described. As shown in FIG. 7, the outer support surface 46 of each of the rollers 44 contacts the lower surface 80 on the lower run 22 of the conveyor belt. If the operator of the conveyor assembly desires to clean the conveyor assembly, the operator can utilize a hose 82 to spray a supply of water 84 in a direction toward the roller shaft 32 when the spacer 56 remains installed on the roller shaft 32. Typically, the conveyor belt will be removed from the conveyor assembly before the cleaning process begins. However, since the spacers 56 do not contact the conveyor belt, cleaning could take place with the conveyor belt still in place as illustrated. As shown in FIG. 7, the spray of water 84 can be directed upward and tangential to the outer surface of the roller shaft 32.

As water is sprayed upward and in a direction toward the spacer 56, the spray of water contacts the series of cleaning fins 78. Since the entire spacer 56 is rotatable about the roller shaft 32 and is contact with the roller shaft 32 at only the standoffs 74, the spray of water 84 will cause the entire spacer 56 to rotate in a direction as illustrated by arrows 86 in FIG. 8. Since the spacer 56 has a series of cleaning fins 78 spaced around its perimeter, the spacer 56 will continue to rotate even as the access opening 64 passes through the water spray 84. The spacer 56 will continue to rotate in the direction shown by arrows 86 as long as the spray of water 84 is supplied.

During the rotation of the spacer 56, the three points of contact created by the standoffs 74 tend to scrape and clean the outer surface of the roller shaft and act as a squeegee to remove any dirt or other material that may be present on the roller shaft. The air gap created by the standoffs 74 allows the cleaning water to pass between the spacer 56 and the outer surface of the roller shaft 32. During the cleaning process, the spacer 56 will rotate at a relatively high RPM which will further aid in cleaning both the spacer 56 and the outer surface of the return shaft 32. In this manner, the return roller assembly 30 can be cleaned in much less time than previous embodiments in which the rollers 44 are held in place by stationary clips along the length of the roller shaft 30.

As can be understood in FIGS. 1-3, each of the spacers 56 can be removed and installed onto the roller shaft 32 when the roller shaft is installed beneath the conveyor frame. Each of the individual spacers 56 can be snapped into place separately to define the required spacing between the rollers 44. Since each of the spacers 56 is rotatable about the stationary roller shaft 32, the spacers 56 can be pushed upward onto the roller shaft 32 and rotated into position as desired. Likewise, when any one of the spacers 56 needs to be removed, the spacer 56 can be rotated such that the user can access the cleaning fins 78 aligned with each of the first and second edges 66, 68. The user can then separate the first and second edges to remove the spacer from the roller shaft 32.

In the embodiment shown in the figures, each of the spacers 56 is formed from a section of excluded material. Each of the spacers 56 can be cut to the desired length from a continuous piece of material that has the cross sectional configuration shown in the drawing figures. In this manner, the spacing between the individual rollers 44 can be dictated as desired and based upon the overall width of the conveyor assembly. In the embodiment illustrated, each of the spacers 56 is formed from a section of extruded plastic material that is both durable and can be sanitized during a cleaning process. However, it is contemplated that other materials could be used while operating within the scope of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:
1. A return roller assembly for use with a conveyor assembly for supporting a lower run of a continuous conveyor belt movably supported by a conveyor frame, the assembly comprising:
   a roller shaft extending across the conveyor frame;

a plurality of rollers positioned along and rotatable about the roller shaft, each of the plurality of rollers being freely movable along a longitudinal length of the roller shaft;

a plurality of spacers each positioned to at least partially surround the roller shaft, wherein when each of the spacers are attached to the roller shaft, the spacers maintain a desired spacing between the plurality of rollers, wherein each of the plurality of spacers has a longitudinal length defined by a generally cylindrical outer wall extending between a first end and a second end; and wherein the outer wall of each of the plurality of spacers includes a removed portion that defines an access opening located between a first edge and a second edge of the outer wall.

2. The roller assembly of claim 1 wherein one of the plurality of spacers is positioned between each pair of the plurality of rollers such that the first end of the spacer contacts a first of the rollers and a second end of the spacer contacts a second of the rollers to define the spacing between the first and the second roller.

3. The roller assembly of claim 1 wherein the width of the access opening is less than a diameter of the roller shaft such that the outer wall flexes to expand the access opening to allow the spacer to be installed to at least partially surround the roller shaft.

4. The roller assembly of claim 1 wherein the outer wall includes an outer surface including a plurality of cleaning fins that each extend from the outer surface, wherein one of the cleaning fins is formed at the first edge of the access opening and another of the cleaning fins is formed at the second edge of the access opening.

5. The roller assembly of claim 1 wherein the outer wall includes an inner surface having a plurality of stand-offs extending from the inner surface, wherein one of the plurality of stand-offs is formed at the first edge of the access opening and another of the stand-offs is formed at the second edge of the access opening, wherein the plurality of stand-offs contact an outer surface of the roller shaft to create an air gap between the inner surface of the spacer and the outer surface of the roller shaft.

6. A return roller assembly for use with a conveyor assembly for supporting a lower run of a continuous conveyor belt movably supported by a conveyor frame, the assembly comprising:

a roller shaft extending across the conveyor frame;

a plurality of rollers positioned along and rotatable about the roller shaft, each of the plurality of rollers being freely movable along a longitudinal length of the roller shaft;

a plurality of spacers each positioned to at least partially surround the roller shaft, wherein when each of the spacers are attached to the roller shaft, the spacers maintain a desired spacing between the plurality of rollers, wherein each of the plurality of spacers has a longitudinal length defined by a generally cylindrical outer wall extending between a first end and a second end; and wherein the outer wall includes an outer surface including a plurality of cleaning fins that extend from the outer surface.

7. The roller assembly of claim 6 wherein each of the cleaning fins extends radially from the outer surface.

8. A return roller assembly for use with a conveyor assembly for supporting a lower run of a continuous conveyor belt movably supported by a conveyor frame, the assembly comprising:

a roller shaft extending across the conveyor frame;

a plurality of rollers positioned along and rotatable about the roller shaft, each of the plurality of rollers being freely movable along a longitudinal length of the roller shaft;

a plurality of spacers each positioned to at least partially surround the roller shaft, wherein when each of the spacers are attached to the roller shaft, the spacers maintain a desired spacing between the plurality of rollers, wherein each of the plurality of spacers has a longitudinal length defined by a generally cylindrical outer wall extending between a first end and a second end; and wherein the outer wall includes an inner surface having a plurality of stand-offs extending from the inner surface, wherein the plurality of stand-offs contact an outer surface of the roller shaft to create an air gap between the inner surface of the spacer and the outer surface of the roller shaft.

9. A return roller assembly for use with a conveyor assembly for supporting a lower run of a continuous conveyor belt movably supported by a conveyor frame, the assembly comprising:

a roller shaft extending across and supported by the conveyor frame;

a plurality of rollers positioned along and rotatable about the roller shaft, each of the plurality of rollers being freely movable along a longitudinal length of the roller shaft;

a plurality of spacers each positioned to at least partially surround the roller shaft and define the spacing between the plurality of rollers, each of the spacers including a generally cylindrical outer wall extending between a first end and a second end, each of the plurality of spacers further including a removed portion of the outer wall to define an access opening located between a first edge and a second edge of the outer wall, wherein each of the spacers are installed on the roller shaft by pressing the spacer into contact with the roller shaft such that the outer wall flexes and the access opening expand to larger than a diameter of the roller shaft.

10. The roller assembly of claim 9 wherein one of the plurality of spacers is positioned between each pair of the plurality of rollers such that the first end of the spacer contacts a first of the rollers and a second end of the spacer contacts a second of the rollers to define the spacing between the first and the second roller.

11. The roller assembly of claim 9 wherein the outer wall includes an outer surface including a plurality of cleaning fins that extend from the outer surface.

12. The roller assembly of claim 11 wherein each of the cleaning fins extends radially from the outer surface.

13. The roller assembly of claim 12 wherein one of the cleaning fins is formed at the first edge of the access opening and another of the cleaning fins is formed at the second edge of the access opening.

14. The roller assembly of claim 11 wherein the outer wall includes an inner surface having a plurality of stand-offs extending from the inner surface, wherein the plurality of stand-offs contact an outer surface of the roller shaft to create an air gap between the inner surface of the spacer and the outer surface of the roller shaft.

15. A conveyor assembly comprising:

a conveyor frame;

a continuous conveyor belt movably supported by a conveyor frame;

a return roller assembly supported by the conveyor frame and positioned to support a lower run of the continuous conveyor belt, the return roller assembly comprising:

a roller shaft extending across and supported by the conveyor frame;

a plurality of rollers positioned along and rotatable about the roller shaft, each of the plurality of rollers being freely movable along a longitudinal length of the roller shaft;

a plurality of spacers each positioned to at least partially surround the roller shaft and define the spacing between the plurality of rollers, each of the spacers including a generally cylindrical outer wall extending between a first end and a second end, each of the plurality of spacers further including a removed portion of the outer wall to define an access opening located between a first edge and a second edge of the outer wall, wherein each of the spacers are installed on the roller shaft by pressing the spacer into contact with the roller shaft such that the outer wall flexes and the access opening expand to larger than a diameter of the roller shaft.

16. The conveyor assembly of claim 15 wherein the outer wall includes an outer surface including a plurality of cleaning fins that extend radially from the outer surface.

17. The conveyor assembly of claim 16 wherein the outer wall includes an inner surface having a plurality of stand-offs extending from the inner surface, wherein the plurality of stand-offs contact an outer surface of the roller shaft to create an air gap between the inner surface of the spacer and the outer surface of the roller shaft.

18. The conveyor assembly of claim 17 where each of the spacers is formed from extruded plastic.

\* \* \* \* \*